(No Model.) 2 Sheets—Sheet 1.
E. C. GREGG & J. P. FELL.
HAY STACKER AND LOADER.
No. 283,882. Patented Aug. 28, 1883.
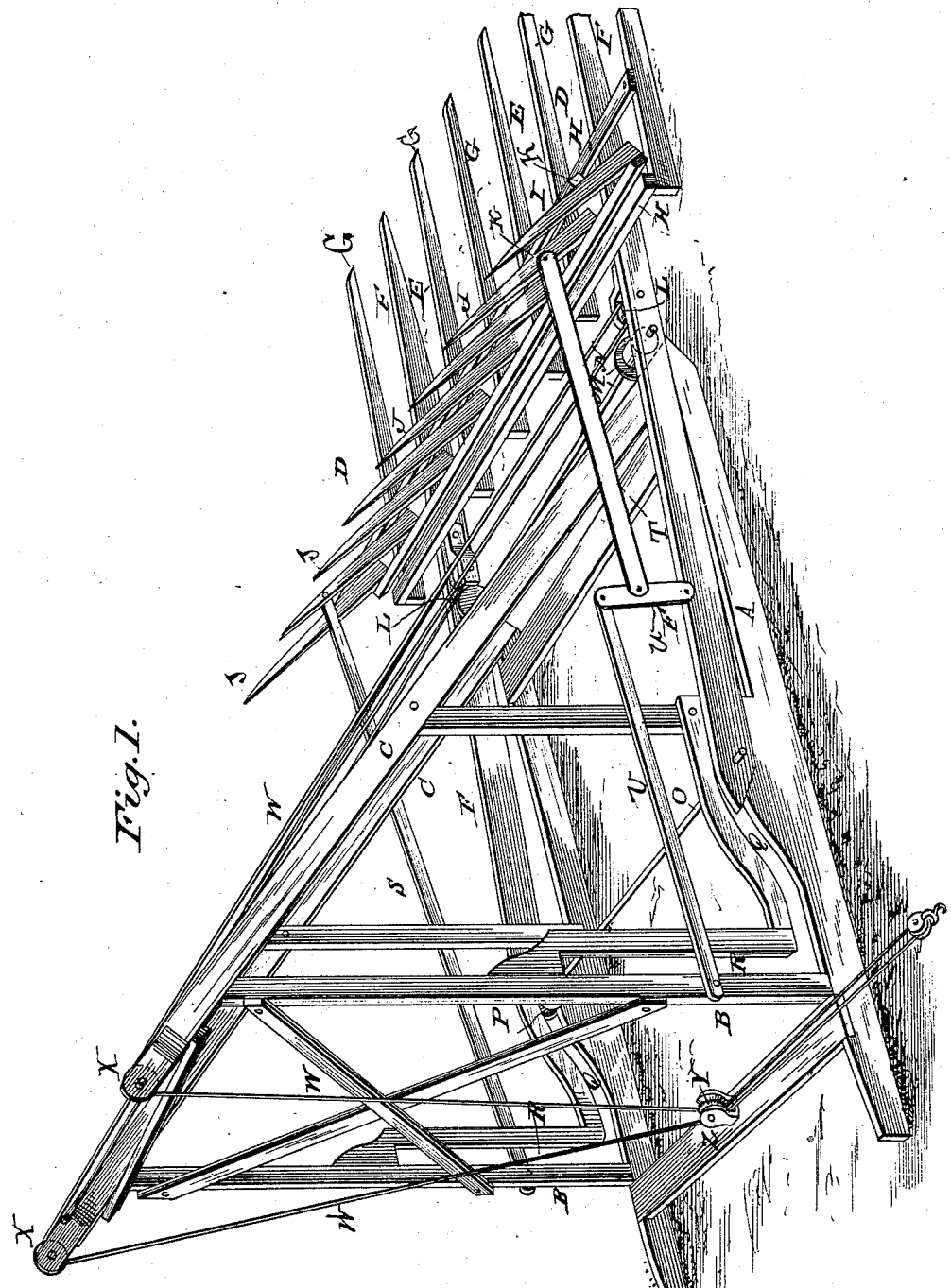

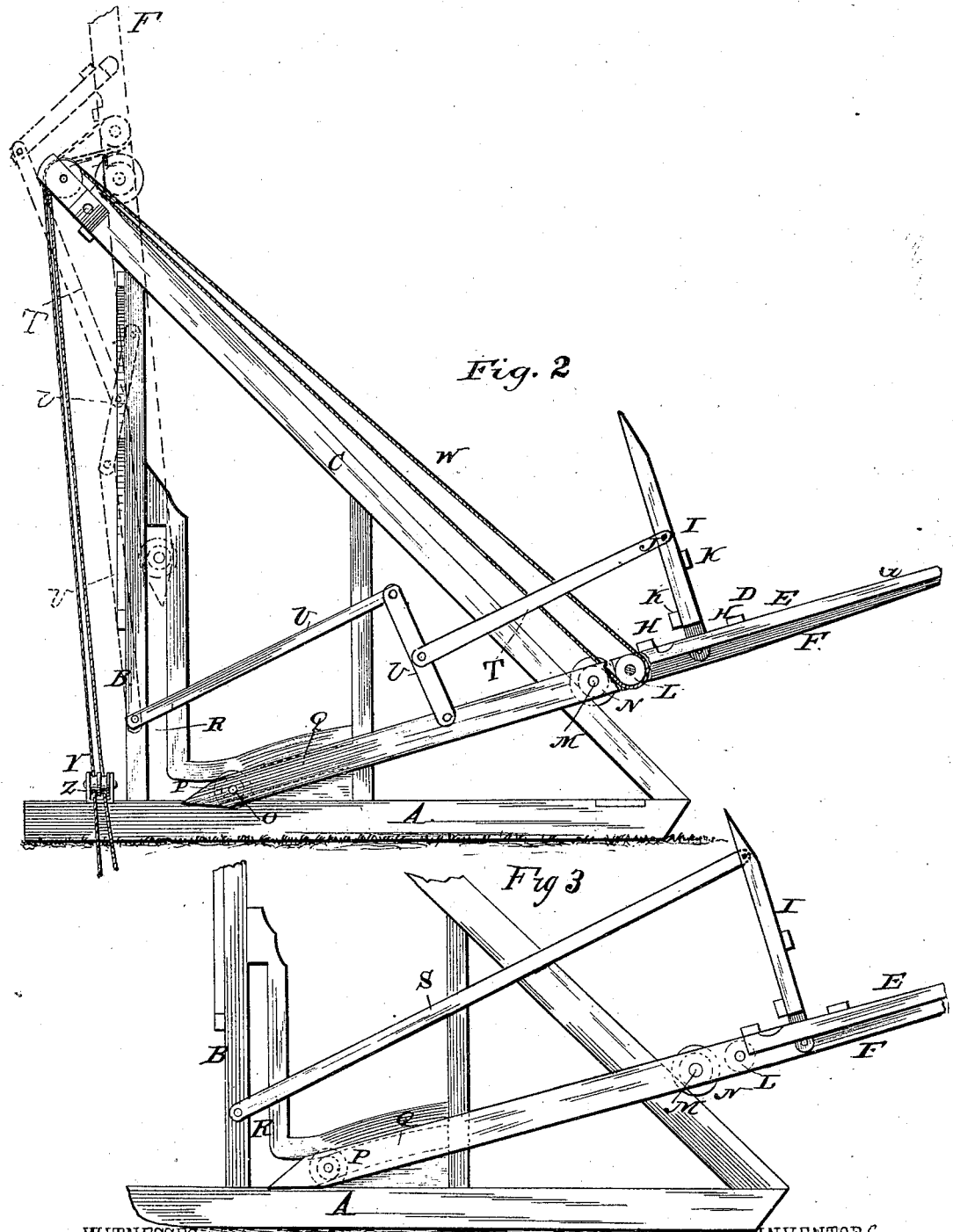

UNITED STATES PATENT OFFICE.

EDGAR C. GREGG AND JASPER P. FELL, OF WHEELING, MISSOURI.

HAY STACKER AND LOADER.

SPECIFICATION forming part of Letters Patent No. 283,882, dated August 28, 1883.

Application filed April 17, 1883. (No model.)

*To all whom it may concern:*

Be it known that we, EDGAR C. GREGG and JASPER P. FELL, of Wheeling, in the county of Livingston and State of Missouri, have invented certain new and useful Improvements in Hay Stackers and Loaders; and we do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of our improved hay-stacker. Fig. 2 is a side view, and Fig. 3 is a similar view, showing a slight modification in the arms operating the compressing-frame.

The same letters of reference indicate the same or corresponding parts in all the figures.

Our invention has relation to hay stackers and loaders; and it consists in the improved construction and combination of parts of the same, as hereinafter more fully described and claimed.

In the accompanying drawings, A indicates the horizontal base-frame, which may be mounted on skids or wheels for the purpose of transporting the device from one place to another. Upon the rear end of this frame are mounted two uprights, B B, supporting the rear portions of the inclined track-beams C C, the lower ends of which are fastened to the front end of the frame, while their upper ends extend over the ends of uprights B.

D is the carrier, consisting of a carrier-frame, E, mounted upon the ends of two rearwardly extending arms, F, and consisting of a series of teeth, G, connected by means of braces H and a compressing-frame, I, hinged to the carrier-arms by two of its teeth, and consisting of a series of teeth, J, connected by braces K.

Two pulleys, L, are pivoted in brackets near the outer ends of the carrier-arms, and the said arms are connected immediately inside the pulleys by means of a rod, M, upon which are pivoted two flanged rollers, N, which travel upon the inclined track-beams.

The inner or rear ends of the carrier-arms are connected by a rod, O, upon which two flanged rollers, P, are pivoted, which travel in upward and forward curved horizontal ways Q upon the base-plate and vertical straight ways R upon the lower portion of the uprights, both ways Q and R connected at the lower rear corner formed by the uprights and the base-rails in L shape.

The compressing-frame is operated either by arms S, hinged near the outer ends of two of the teeth and to the uprights, some distance above the base-frame, one on each side, or as shown in Figs. 1 and 2, and as we prefer to use, by means of hinged arms T, hinged near the outer ends of two of the teeth and to the middle of short arms U, which are hinged at one end to the carrier-arms, toward their rear ends, and at their other ends to hinged arms V, which are hinged to the uprights, the latter construction involving less strain upon the compressing-arms, part of the strain being borne by the carrier-arms.

The ropes W, which operate the carrier, are fastened to the upper ends of the track-beams, carried over pulleys L near the outer ends of the carrier-arms, over pulleys X at the upper ends of the track-beams, and down over pulleys Y, pivoted in a swiveled block, Z, upon the end of the base-frame, whence they are connected in any suitable manner with the draft to be applied.

By the foregoing description, taken in connection with the accompanying drawings, the operation of our device will be easily understood. When the carrier is lowered to the ground, the load is deposited upon it, and when draft is applied to the ropes the carrier is raised upon the inclined track, and the load is clasped and compressed by the compressing-frame until it reaches the top, when the compressing-frame is tilted backward and downward, dumping the load upon the stack or hay-wagon.

It will be seen that by having the rollers upon the rear ends of the carrier-arms traveling in the forward-curved and upward-pointing L-shaped ways the carrier-arms may be made proportionately shorter than when hinged to pivoted arms, thus making the strain upon them less, and more equally divided upon the supporting-frame; and that by curving the forward ends of the ways upward and forward the forward end of the carrier is inclined toward the ground when in its down position, thus making the loading of it easier.

Having thus described our invention, we claim and desire to secure by Letters Patent of the United States—

1. In a hay stacker and loader, the combination of the L-shaped ways, having horizontally upwardly and forwardly curved portions Q, and straight vertical portions R, with the frame E, carrier-arms F, flanged rollers P, and means for raising and lowering the carrier, as and for the purpose shown and set forth.

2. In a hay stacker, the combination of the uprights B, the carrier-frame E, and the compressing-frame I, hinged to the carrier-frame, with the toggle-links T V, and levers U, hinged together and to the compressing-frame, to the carrier-arms, and the uprights, as and for the purpose shown and set forth.

3. The combination, in a hay-stacker, of the carrier-frame E, carrier-arms F, provided at their rear ends with flanged rollers P, ways Q R, compressing-frame I, hinged to the carrier-frame, and hinged operating-arms T U V, as and for the purpose shown and set forth.

4. As an improvement in hay stackers and loaders, the combination of the base-frame A and uprights B, forming ways Q R, inclined track C, carrier-frame E, arms F, compressing-frames I, hinged arms T U V, flanged rollers N and P, pulleys L, X, and Y, swiveled block Z, and hoisting-ropes W, all constructed and operating as and for the purpose shown and set forth.

In testimony that we claim the foregoing as our own we have hereunto affixed our signatures in presence of two witnesses.

EDGAR C. GREGG.
JASPER P. FELL.

Witnesses:
WILLIAM SCRUBY,
HORACE SCRUBY.